United States Patent
Bates et al.

(10) Patent No.: US 9,594,669 B2
(45) Date of Patent: Mar. 14, 2017

(54) DEBUG MANAGEMENT USING A COUNTER

(71) Applicant: International Business Machines Corporation, Armonk, NY (US)

(72) Inventors: Cary L. Bates, Rochester, MN (US); Lee Helgeson, Rochester, MN (US); Justin K. King, Rochester, MN (US); Michelle A. Schlicht, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/700,849

(22) Filed: Apr. 30, 2015

(65) Prior Publication Data

US 2016/0321162 A1   Nov. 3, 2016

(51) Int. Cl.
G06F 11/36   (2006.01)

(52) U.S. Cl.
CPC ...... *G06F 11/3636* (2013.01); *G06F 11/3624* (2013.01); *G06F 11/3664* (2013.01)

(58) Field of Classification Search
CPC ............... G06F 11/3616; G06F 11/362; G06F 11/3624; G06F 11/3636; G06F 11/3664
See application file for complete search history.

(56) References Cited

U.S. PATENT DOCUMENTS

| | | | |
|---|---|---|---|
| 4,720,778 A | | 1/1988 | Hall et al. |
| 5,748,878 A | | 5/1998 | Rees et al. |
| 5,937,191 A | * | 8/1999 | Graham ............ G06F 8/20 702/182 |
| 6,047,390 A | * | 4/2000 | Butt ............ G06F 11/3466 714/43 |
| 6,049,666 A | * | 4/2000 | Bennett ............ G06F 11/323 714/E11.181 |
| 6,173,395 B1 | * | 1/2001 | Wisor ............ G06F 11/3636 712/227 |
| 6,192,511 B1 | * | 2/2001 | Johnston ............ G06F 11/3664 702/182 |
| 6,751,751 B1 | * | 6/2004 | Murray ............ G06F 11/364 710/15 |
| 6,839,893 B2 | | 1/2005 | Bates et al. |
| 7,552,425 B2 | | 6/2009 | Bates et al. |

(Continued)

OTHER PUBLICATIONS

Sherwood et al., "Basic block distribution analysis to find periodic behavior and simulation points in applications," 2001, Proceedings. 2001 International Conference on Parallel Architectures and Compilation Techniques, pp. 3-14.*

(Continued)

*Primary Examiner* — Tuan Q. Dam
*Assistant Examiner* — Stephen Berman
(74) *Attorney, Agent, or Firm* — Kevin Kehe

(57) ABSTRACT

Disclosed aspects include identifying basic blocks of a program. For each basic block, the compiler inserts an identifier that includes the function name, and is coupled with a counter variable. In response to generating the identifier coupled with the counter variable, the program is compiled. During program execution, the counter value is incremented in response to a call of the basic block when executing the program. In response to incrementing the counter value, the counter value coupled with the identifier is displayed.

15 Claims, 5 Drawing Sheets

(56) References Cited

U.S. PATENT DOCUMENTS

| | | | |
|---|---|---|---|
| 8,136,096 B1 | 3/2012 | Lindahl et al. | |
| 8,214,694 B1* | 7/2012 | McKechnie | G06F 11/364 326/16 |
| 8,429,632 B1 | 4/2013 | Coutant et al. | |
| 8,458,681 B1 | 6/2013 | Coutant et al. | |
| 8,484,623 B2* | 7/2013 | Li | G06F 11/3636 717/130 |
| 9,477,577 B2* | 10/2016 | Baca | G06F 11/3624 |
| 2003/0041315 A1* | 2/2003 | Bates | G06F 11/3636 717/129 |
| 2003/0061600 A1* | 3/2003 | Bates | G06F 11/3664 717/133 |
| 2003/0188298 A1* | 10/2003 | Shaposhnick | G06F 11/3676 717/141 |
| 2005/0138471 A1 | 6/2005 | Okbay et al. | |
| 2005/0240824 A1* | 10/2005 | Bates | G06F 11/3664 714/38.12 |
| 2009/0055813 A1* | 2/2009 | Haber | G06F 8/4441 717/158 |
| 2009/0125889 A1* | 5/2009 | Imaeda | G06F 9/3005 717/129 |
| 2009/0328006 A1* | 12/2009 | Naruse | G06F 11/3636 717/128 |
| 2010/0005249 A1* | 1/2010 | Bates | G06F 11/3664 711/154 |
| 2011/0138368 A1* | 6/2011 | Krauss | G06F 11/3466 717/133 |
| 2012/0246624 A1* | 9/2012 | Halliday | G06F 11/3664 717/129 |
| 2012/0246627 A1* | 9/2012 | Partridge | G06F 8/4441 717/158 |
| 2013/0055214 A1* | 2/2013 | Harrison | G06F 11/3676 717/127 |
| 2013/0117730 A1* | 5/2013 | Wisniewski | G06F 11/3664 717/125 |
| 2013/0275948 A1* | 10/2013 | Bates | G06F 11/3624 717/124 |
| 2013/0283243 A1* | 10/2013 | Bates | G06F 8/443 717/129 |
| 2013/0311972 A1 | 11/2013 | Supplisson et al. | |
| 2016/0098326 A1* | 4/2016 | Rebello | G06F 11/3648 714/55 |

OTHER PUBLICATIONS

Tikir et al., "Efficient instrumentation for code coverage testing," 2002, Proceedings ISSTA '02 Proceedings of the 2002 ACM SIGSOFT international symposium on Software testing and analysis, pp. 86-96.*

Luk et al., "Pin: Building Customized Program Analysis Tools with Dynamic Instrumentation," 2005, Proceeding PLDI '05 Proceedings of the 2005 ACM SIGPLAN conference on Programming language design and implementation, pp. 190-200.*

Ball et al., "Efficient path profiling," 1996, Proceedings of the 29th annual ACM/IEEE international symposium on Microarchitecture, pp. 46-57.*

Gill et al., "Haskell program coverage," 2007, Haskell '07 Proceedings of the ACM SIGPLAN workshop on Haskell workshop, pp. 1-12.*

Larson et al., "Improving the Linux Test Project with Kernel Code Coverage Analysis," 2003, Proceedings of the Linux Symposium, Jul. 23-26, 2003, Ottawa, Ontario Canada, pp. 275-290.*

Bates et al., "Debug Management Using a Counter", U.S. Appl. No. 14/716,769, filed May 19, 2015.

List of IBM Patents or Patent Applications Treated as Related.

A method to alert users to improperly set breakpoints based on call prediction, IP.com No. 000195180, Apr. 22, 2010.

Method to enable debugger breakpoint inside statement, IP.com No. 000206941, May 13, 2011.

* cited by examiner

DEBUG MANAGEMENT USING A COUNTER

BACKGROUND

This disclosure relates generally to computer systems and, more particularly, relates to debug management. As computers have become faster and available memory has increased, software has also become more and more complex. A typical software application may contain millions of lines of code. With the increased complexity of software applications, the issues associated with the code as written have become more numerous and difficult to resolve. As code complexity has increased, the need for debug management efficiency may increase.

SUMMARY

Aspects of the disclosure include a compiler generating a counter value/variable at beginnings of routines and within loops. The counters can be incremented on calls and iterations. In embodiments, the counter value is a static variable. The static variable is allocated at compile-time before the program is executed and spans an entire run of the program. Such information may be displayed as part of a call stack display. Utilizing the information, breakpoints may be set that can stop execution at a selected point prior to the error occurring so that the error can be watched. Accordingly, aspects may have positive impacts in determining causes of error events.

Basic blocks of a program may be identified. For each basic block, the compiler inserts an identifier that includes the function name, and is coupled with a counter variable. In response to generating the identifier coupled with the counter variable, the program is compiled. During program execution, the counter value is incremented in response to a call of the basic block when executing the program. In response to incrementing the counter value, the counter value coupled with the identifier (corresponding to the basic block of the program) is displayed. In embodiments, debug management may use location references to indicate where to stop the program prior to an error location (e.g., line of code).

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
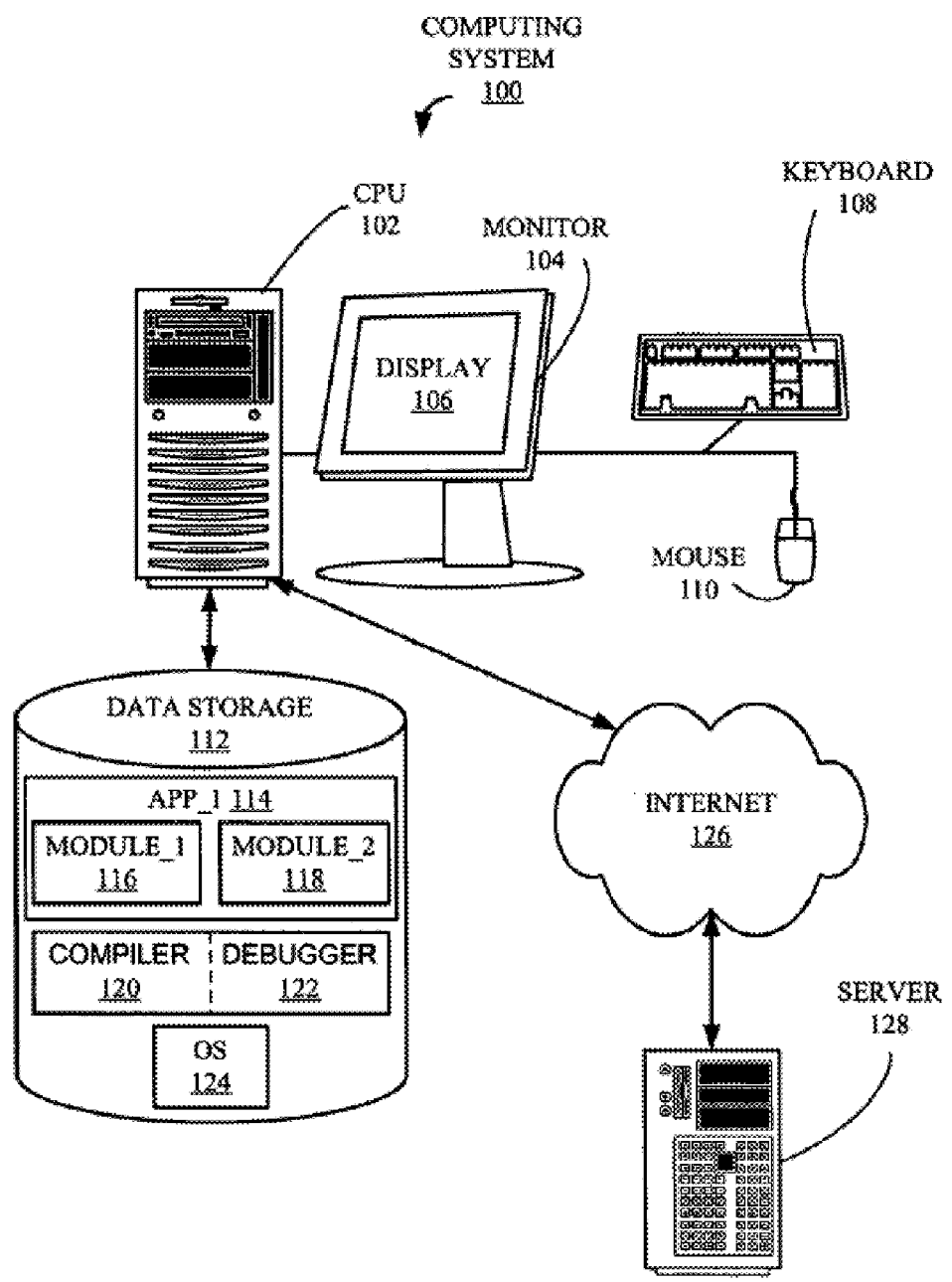
FIG. 1 depicts an exemplary computing system according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure include a compiler generating a counter value/variable at beginnings of routines and within loops. The counters can be incremented on calls and iterations. Such information (e.g., identifier and count) may be displayed as part of a call stack display. Utilizing the information, breakpoints may be set (e.g., by a user) that can stop execution at a selected point (e.g., chosen by the user) prior to the error occurring so that the error can be watched (e.g., by the user). Accordingly, aspects may have positive impacts in determining causes of error events.

One challenge when debugging code, including matters that have large sets of data in order to reproduce errors/bugs, is that it may be challenging to stop just prior to the point of the error event once the program fails and execution is halted. Sometimes the point where the error occurs is called millions of times prior to the failure and there may be no obvious way to set a conditional breakpoint using variables within the program to gain control at the proper moment without writing lots of code. Accordingly, a methodology that dynamically supplies users the capability to stop the program just prior to the point at which it crashes may provide performance or efficiency benefits.

Aspects of the disclosure include a method, system, and computer program product for debug management. Debug management has a set of operations/aspects/features/components. Basic blocks of a program are identified. A compiler generates a counter value. The counter value is coupled with an identifier. The identifier corresponds to a basic block of the program. In response to generating the counter value coupled with the identifier, the program is compiled. The counter value is incremented in response to a call of the basic block when executing the program. In response to incrementing the counter value, the counter value coupled with the identifier (corresponding to the basic block of the program) is displayed.

Illustrative embodiments may relate to error events or error locations. In response to incrementing the counter value, an error event can be detected (the error event being detached/separate from the basic block). To tend to the error event, a breakpoint can be established (the breakpoint being linked with the basic block corresponding with the identifier coupled with the counter value). In embodiments, debug management may use location references to indicate where to stop the program prior to an error location (e.g., line of code).

Embodiments may relate to particular aspects associated with the counter value. For example, the counter value may be collected in response to incrementing the counter value. In response to collecting the counter value, a request may be received. The request may be to step to the basic block corresponding with the identifier coupled with the counter value. In embodiments, the counter value is a static variable. The static variable is allocated at compile-time before the program is executed and spans an entire run of the program.

Aspects of the disclosure may include an output. For instance, the basic block can be displayed in a basic block order which is based on an outer-to-inner criterion. As another example, the basic block may be presented in an expanded form when the counter value and the identifier are displayed by a stack display. In addition, a mismatch notification may be provided in response to a mismatch of the counter value and a stack counter value (e.g., when firing a breakpoint linked with the basic block corresponding with the identifier coupled with the counter value). Altogether, aspects of the disclosure provide a methodology for debug management that may provide performance or efficiency benefits (e.g., speed, flexibility, responsiveness, resource usage).

Turning now to the figures, FIG. 1 is a block diagram of an exemplary computing system architecture 100 which can incorporate aspects of the disclosure including the claimed subject matter. A central processing unit (CPU) 102 is coupled to a monitor 104, a keyboard 108 and a mouse 110, which together facilitate human interaction with computing system 100. Within monitor 104 is a display 106 that presents a graphical user interface (GUI) for applications such as an exemplary application, or "App_1," 114. CPU 102 is coupled to a data storage component 112, which may either be incorporated into CPU 102 (i.e., an internal device), or attached externally to CPU 102 by means of various, commonly available connection devices such as but not limited to, a universal serial bus (USB) port (not shown). Data storage 112 is illustrated storing exemplary software application, or "App_1," 114, which includes two (2) exemplary computer programming modules (i.e., a "Module_1," 116 and a "Module_2," 118). Module_1 116 is shown in more detail below in conjunction with other aspects herein. It should be noted that a typical computing system would include more than one application and a typical application would include more than two (2) modules, but for the sake of simplicity only one application and two modules are shown. Also stored on data storage 112 is a compiler 120, which includes a debugger component 122. Compiler 120 and debugger 122 are configured to implement aspects of the disclosure including the claimed subject matter, as described herein.

CPU 102 is connected to the Internet 126, which is also connected to a server computer 128. Although in this example, CPU 102 and server 128 are communicatively coupled via the Internet 126, they could also be coupled through any number of communication mediums such as, but not limited to, a local area network (LAN) (not shown). Further, it should be noted there are many possible computing system configurations that may support the claimed subject matter, of which computing system 100 is only one simple example.

Figure 2:
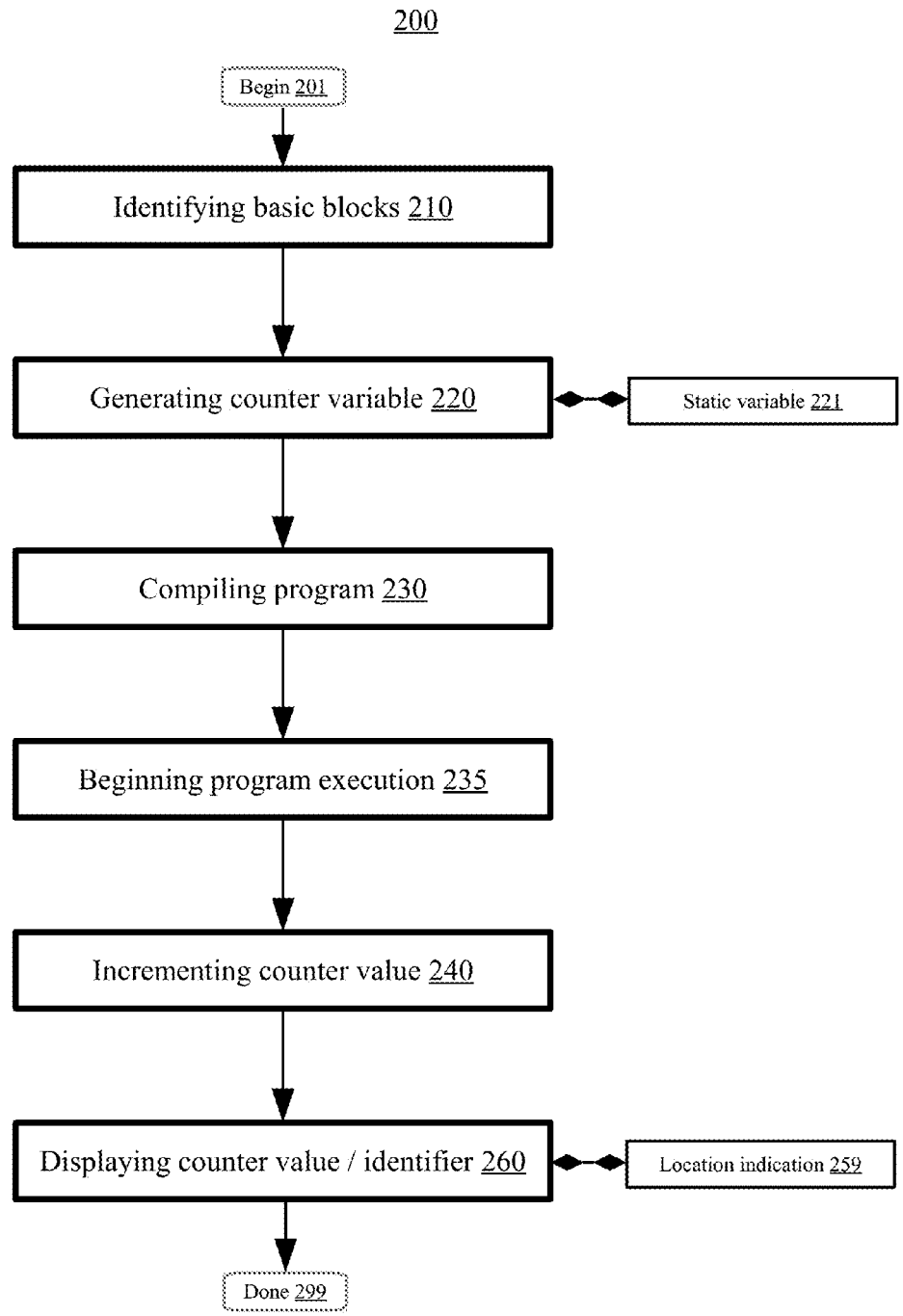
FIG. 2 is a flowchart illustrating a method for debug management according to embodiments.

FIG. 2 is a flowchart illustrating a method 200 for debug management according to embodiments. Method 200 may begin at block 201. At block 210, basic blocks of a program are identified. Identifying can include analyzing, detecting, finding, recognizing, or selecting. The program includes software that performs tasks for an end-user. The program may have sequences of machine-level instructions capable of execution on a processor. A block is a section of code which is grouped together. A basic block includes a portion of code within the program with one entry point and one exit point. As such, when a first instruction in the basic block is executed, the rest of the instructions are executed once, in order. The code may be source code, assembly code, or some other sequence of instructions. The blocks to which control may transfer after reaching the end of a block are called that block's successors, while the blocks from which control may have come when entering a block are called that block's predecessors. The start of a basic block may be jumped to from more than one location. As such basic blocks may be one or more groups of contiguous instructions.

At block 220, a compiler generates a counter variable. For example, the counter variable is an integer (e.g., 0, 1, 2, 3). The counter variable is coupled with an identifier (e.g., a set of characters). The identifier corresponds to a particular basic block of the program (e.g., the identifier "foo_entry_reference" corresponds to the entry point of foo). The terms counter variable and counter value may be used interchangeably herein with reference to an element/feature/mechanism referred to as a counter. In general, a counter variable is intended to be utilized in a pre-compilation context whereas a counter value is intended to be utilized in a post-compilation context.

In embodiments, the counter variable is a static variable at block 221. The static variable can be allocated at compile-time before the program is executed and may span an entire run of the program. Aspects of the generated counter variable used with the identifier may provide a location reference point for efficient debug management. At block 230, in response to generating the counter variable coupled with the identifier, the program is compiled. Program execution may begin at block 235.

At block 240, the counter value is incremented in response to a call of the basic block when executing the program. Executing the program includes initiating, launching, performing, running, or carrying-out the program. The call may specify a routine name, and possibly one or more parameters. For instance, the call may jump to the basic block to perform an operation. In response to the call, incrementing may be triggered. For example, when the counter value is an integer, incrementing the counter value includes adding one to a current value (e.g., 0+1=1, 142+1=143). As such, the number/quantity of times the basic block has been called may be observed/tracked which may assist in determining a referencing point to stop at or set a breakpoint when debugging.

The debugger (or a user performing debugging) can utilize location references to indicate where to stop the program prior to an error location (see block 259). At block 260, in response to incrementing the counter value, the counter value coupled with the identifier (corresponding to the basic block of the program) is displayed. Displaying can include presenting or providing a graphical user interface to a user. In embodiments, the counter value coupled with the identifier is displayed in a multi-dimensional array. Displaying may include a call stack display being processed for presentation to the user. Where to stop the program may be quickly determined using displayed aspects. In addition, aspects provide flexibility using the counter value to make such determinations (as opposed to just stopping at a particular basic block without the counter value).

Method 200 concludes at block 299. Aspects of method 200 may provide performance or efficiency benefits for debug management. For example, aspects of method 200 may include increased flexibility for stepping through a program or setting breakpoints. Altogether, performance or efficiency benefits when debugging may occur (e.g., speed, flexibility, responsiveness, resource usage).

Figure 3:
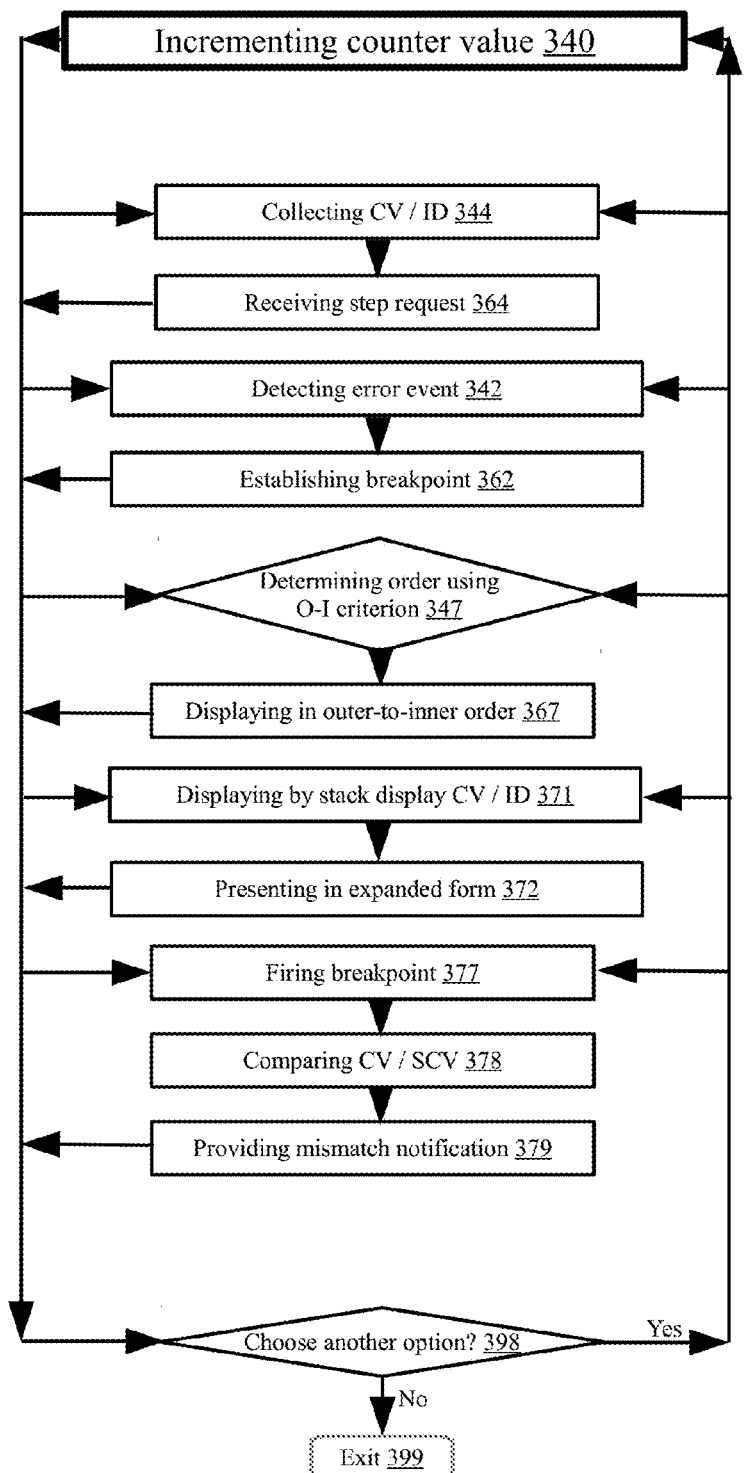
FIG. 3 is a flowchart illustrating a method for debug management according to embodiments.

FIG. 3 is a flowchart illustrating a method 300 for debug management according to embodiments. Method 300 may be incorporated into/with method 200. For example, aspects of method 300 may fit subsequent to incrementing the counter value at block 240 of method 200. As such, aspects of method 300 may be useful in implementing overall operation of debug management according to method 200.

Arrows in the illustration indicate entry/exit places for aspects of method 300. A set of groupings has been made to facilitate efficient performance/operation. Method 300 illustrates features which may be included (or not included) in certain embodiments.

Method 300 begins by incrementing the counter value at block 340 which is similar or the same as incrementing the counter value at block 240 in method 200. Aspects of method 300 may be used in concert with one another or be utilized multiple times before/after other aspects. At block 398, a determination may be made whether to pursue another operational aspect. If another operational aspect is not selected, method 300 exits at block 399 (which may proceed to an operation such as displaying information in a manner such as block 260 of method 200).

In embodiments, the counter value may be collected (in response to incrementing the counter value) at block 344. Collecting at block 344 may include collecting the identifier. Collecting can include accumulating, acquiring, aggregating, capturing, gathering, obtaining, saving, or storing. The collecting may occur in memory (e.g., volatile memory). In response to collecting the counter value, a request may be received at block 364. The request may be from a user of the debugger. The request may be to step to the basic block corresponding with the identifier coupled with the counter value. For example, a request for "BAR-224" may initiate an operation of stepping to the 224th entry of a specific routine identified as BAR.

Certain embodiments may relate to error events or error locations. In response to incrementing the counter value, an error event can be detected at block 342. The error event can includes errors or bugs such as dynamic semantic errors or logical errors. The error event can be detached/separate from the basic block. For example, the basic block with the identifier and counter value may error-free, but another block prior to it in code may include the error event. As such, in this way, the basic block would be detached/separate from the error event. Thus, the location of the identifier/counter value may be different (e.g., subsequent to) the block having the error event. To tend to (e.g., address, fix, debug) the error event, a breakpoint can be established at block 362. The breakpoint may be linked with the basic block corresponding with the identifier coupled with the counter value. For instance, the breakpoint may be set for the basic block. As another example, it may be set for a location prior to the basic block. The user may input where to set the breakpoint and the debug management system may receive/detect the input. For example, the breakpoint can be established/created/set at line 106 and linked with a basic block at line 120 corresponding with the identifier coupled with the counter value at that line (e.g., FOO-7).

In embodiments, an output (e.g., to a display) may be included. In some instances, the output may be displayed in line number order. In certain cases, a basic block order for debugging may be determined at block 347. The determination can be based on an outer-to-inner criterion. To illustrate, a range of loops may be utilized and analyzed. If analysis indicates the range of loops includes another loop, displaying/printing may occur outward to inward. As such, the basic block may be displayed in the basic block order at block 367. Performance/efficiency benefits may result from such a display being presented in an orderly manner (as opposed to having to inefficiently load a number of pages to reach the appropriate data).

In embodiments, the counter value coupled with the identifier corresponding to the basic block of the program may be displayed by a stack display at block 371. The stack display may show/display a call stack. The call stack can be a stack data structure that stores information about subroutines of the program. This kind of stack is also known as an execution stack, control stack, run-time stack, or machine stack. The basic block may be presented in an expanded form at block 372. As such, a loop may be expanded. Having such a scope of view may save a number of requests being made (e.g., by the user seeking information). The expanded form may provide performance/efficiency benefits itself or, for example, in addition to the basic block order for displaying (e.g., using the outer-to-inner criterion).

In embodiments, a set of operations may lead to a notification (e.g., pop-up-window/message to a user). A breakpoint may be fired at block 377 (the breakpoint being linked with the basic block corresponding with the identifier coupled with the counter value). In response to firing the breakpoint, the counter value and a stack counter value (e.g., a collected counter value in a cache/memory) may be compared at block 378. In response to a mismatch of the counter value and a stack counter value, a mismatch notification may be provided at block 379. The mismatch notification may warn the user that a current run does not exactly match a failed run. When working with large amounts of data or long runs, the mismatch notification may have performance/efficiency benefits.

Method 300 exits at block 399. For example, aspects of method 300 may include increased flexibility for stepping through a program or setting breakpoints. Altogether, performance or efficiency benefits when debugging may occur (e.g., early detection, avoiding threading issues, avoiding race conditions).

Figure 4:
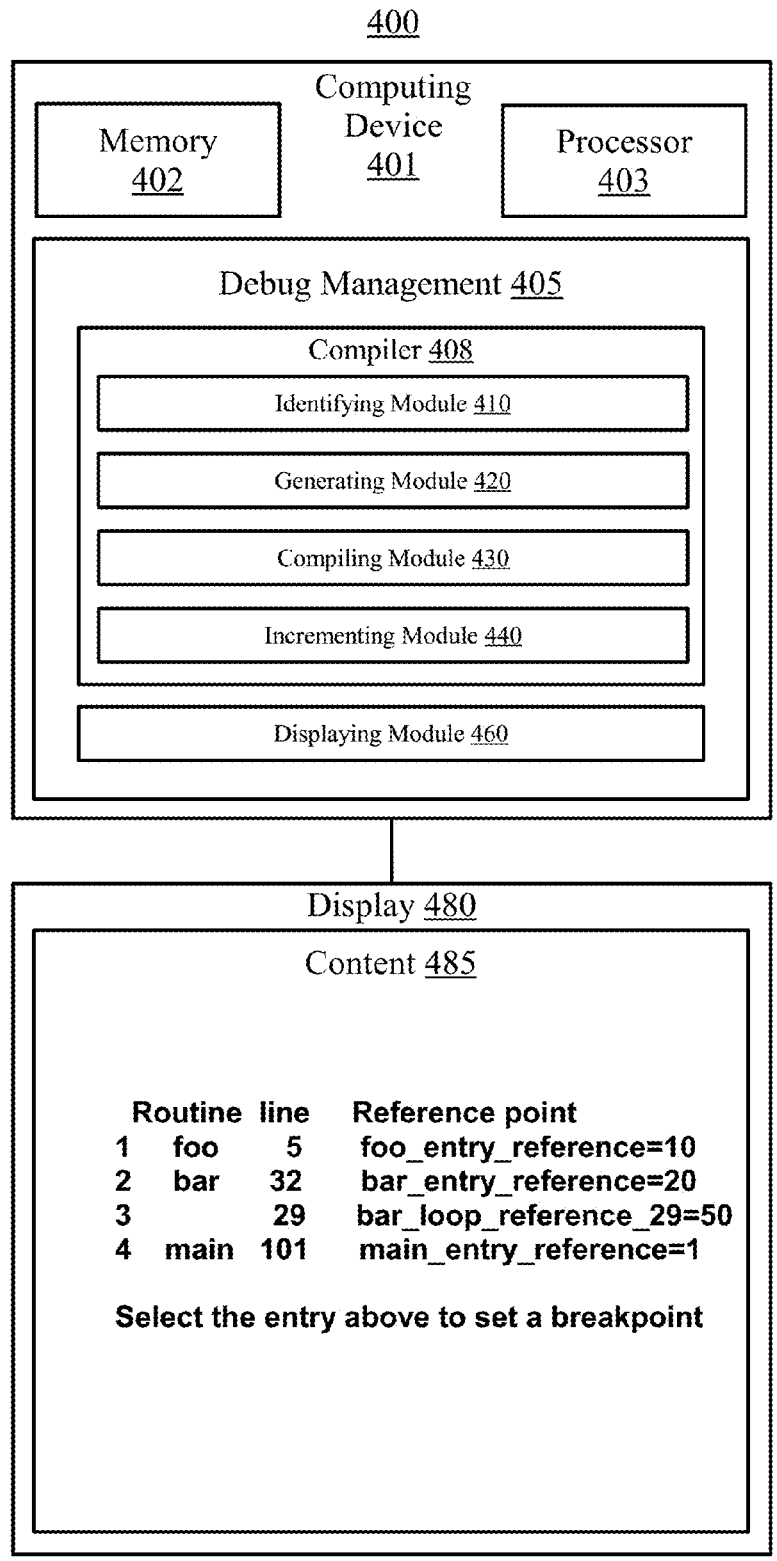
FIG. 4 shows an example system for debug management according to embodiments.

FIG. 4 shows an example system 400 for debug management according to embodiments. A computing device 401 having memory 402 and processor 403 may be coupled/connected with display 480 (e.g., a physical display apparatus such as a monitor). In embodiments, method 200 or 300 may be used/applied/implemented in a debug management module 405. Though other combinations (including other aspects/features) are considered, the diagram depicts a displaying module 460 and a compiler 408 having an identifying module 410, a generating module 420, a compiling module 430, and an incrementing module 440. Such aspects may correspond to aspects described in method 200. The debug management module 405 is not limited to such aspects, and may include one or more aspects described with respect to method 300. Display 480 can include content 485, described herein.

When a debuggable program is compiled (e.g., using compiling module 430), the compiler may insert counters (e.g., using generating module 420) into program code within loops and routines so that the programmer has a reference point to stop at. These counters can be static variables that will only increment (e.g., using incrementing module 440), so their value will always go up. This can reduce the amount of code that needs to be inserted and make the referenced point more usable for stopping at the same reference point in repeated runs that are similar (e.g., effectively identical). An example of a stack display (e.g., provided by displaying module 460) for aspects of the disclosure is shown as content 485.

The stack (content 485) shows an entry reference variable, and value that can be used to stop the program at that reference point. The loop range for a loop that a reference variable is added for may be added to debug data. Accordingly, when the program stops and the stack is retrieved the stop location within the routine can be used to detect the loops that the routine is within. Entries can be displayed in line number order. In embodiments, aspects could use the range of the loops to determine whether it contains other loops and print/display them in the order of outer-most to inner-most.

In response to a program crashing and a deep stack having been stored, the user can look at the debugging reference variables and step breakpoints such as "stop in foo if foo_entry_reference=10." Such a command would cause the debugger to run to the 10th call of foo( ) and stop on the first statement (the counter would be incremented before the first statement). Having such reference points available at stack entries and loop executions can provide flexibility when determining when/where to stop.

In embodiments, the reference points (counters/identifiers) can be utilized to detect whether the run was consistent with the failure. When the first program fails, the user can dump/store the failure point. The stored data can include the stack and reference information. In the next session, the user can issue a 'stop a previous failure command.' The previous stack may be displayed with the loops expanded. The user could subsequently select the stopping point from the stack.

Using content 485 as an example, if the user selects 1, an internal conditional breakpoint is set on the first line of foo to stop when foo_entry_reference=10. Other information may be associated with this breakpoint so that when it fires the stack performs a verification check. The verification check may verify features are consistent with what they were at the point of failure, and that the reference counts associated with the loops and entries on the stack match. If the entries do not match, the user can be warned that the run may not exactly match the run that failed. Such aspects can assist users stop just prior to the point of failure and discover/determine that the run they have was consistent with the run that failed.

Aspects of system 400 may provide performance or efficiency benefits for debug management and its associated challenges (e.g., large data sets, long runs). For example, aspects of system may include increased flexibility for stepping through a program or setting breakpoints. As an additional example, aspects of system 400 may save resources such as bandwidth, processing, or memory. Altogether, performance or efficiency benefits when debugging may occur (e.g., speed, flexibility, responsiveness, resource usage).

Figure 5:
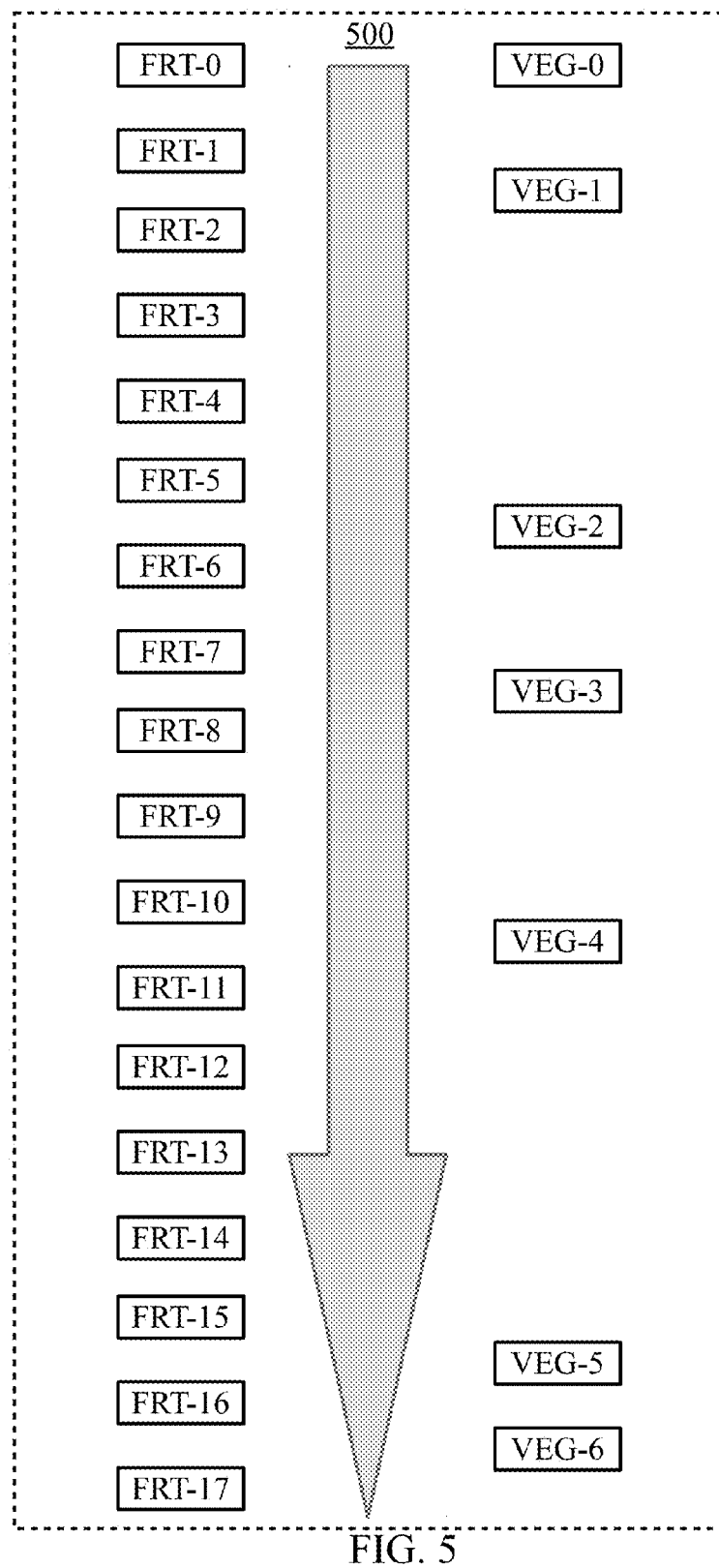
FIG. 5 shows an example system for debug management having a plurality of counters shown over time according to embodiments.

FIG. 5 shows an example system 500 for debug management having a plurality of counters shown over time according to embodiments. For example, consider a nutrition analysis program which has a fruit tracker routine and a vegetable tracker routine. A set of fruit tracking code from the fruit tracker routine and a set of vegetable tracking code from the vegetable tracker routine are identified as basic blocks. A compiler generates a fruit code entry counter coupled with a fruit code identifier for the set of fruit tracking code (e.g., "FRT-0") and a vegetable code entry counter coupled with a vegetable code identifier for the set of vegetable tracking code (e.g., "VEG-0"). The nutrition analysis program is subsequently compiled. When executing the program, the fruit code entry counter is incremented over time whenever the set of fruit tracking code is called (e.g., "FRT-0" becomes "FRT-1" becomes "FRT-2" becomes "FRT-3" and so on). The vegetable code entry counter is incremented similarly. In embodiments, the fruit code entry counter may reach 14 when the vegetable code entry counter is at 4 (e.g., when the set of fruit tracking code is called more frequently). Subsequently, the fruit code entry counter coupled with the fruit code identifier corresponding to the set of fruit tracking code may be displayed (e.g., "FRT-14").

As another example, a request for "FRT-16" lead to stepping to the location in code where the fruit code entry counter is at its 16th iteration (e.g., which then may allow analysis of the set of vegetable tracking code at a stage/phase before its 6th iteration).

In addition to embodiments described above, other embodiments having fewer operational steps, more operational steps, or different operational steps are contemplated. Also, some embodiments may perform some or all of the above operational steps in a different order. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method for debug management, the method comprising:
    identifying a set of basic blocks of a program;
    generating, by a compiler, a counter coupled with an identifier corresponding to a basic block of the program;
    compiling, in response to generating the counter coupled with the identifier, the program;
    initiating execution of the program;
    calling the basic block, wherein calling the basic block indicates to trigger incrementation of the counter;
    incrementing the counter;
    detecting, in response to incrementing the counter, an error event which is detached from the basic block;
    establishing, to tend to the error event which is detached from the basic block, a breakpoint linked with the basic block corresponding with the identifier coupled with the counter;
    determining, based on an outer-to-inner criterion, a basic block order for debugging;
    displaying, in response to incrementing the counter, the counter coupled with the identifier corresponding to the basic block of the program; and
    displaying, to load a single page having the error event, the basic block in the basic block order.

2. The method of claim 1, wherein the counter is a static variable which is allocated at compile-time before the program is executed and spans an entire run of the program, further comprising:
    using the counter to provide a location reference point.

3. The method of claim 1, further comprising:
    collecting, in response to incrementing the counter, the counter coupled with the identifier; and
    receiving, in response to collecting the counter coupled with the identifier, a request to step to the basic block corresponding with the identifier coupled with the counter.

4. The method of claim 1, wherein displaying the counter coupled with the identifier corresponding to the basic block of the program includes:
    displaying, by a stack display, the counter coupled with the identifier corresponding to the basic block of the program; and
    presenting, in an automated fashion without a request from a user for an expanded form, the basic block in the expanded form.

5. The method of claim 1, further comprising:
    firing a breakpoint linked with the basic block corresponding with the identifier coupled with the counter;
    comparing, in response to firing the breakpoint, the counter and a stack counter; and
    providing, in response to a mismatch of the counter and the stack counter, a mismatch notification to a user.

6. The method of claim 1, wherein debug management uses location references to indicate where to stop the program prior to an error location.

7. The method of claim 1, further comprising:
    establishing the breakpoint in a first instruction of a set of code of the program.

8. The method of claim 7, further comprising:
    linking the breakpoint in the first instruction with a second instruction in the basic block.

9. The method of claim 8, wherein the second instruction corresponds with the counter coupled with the identifier.

10. The method of claim 9, wherein the first and second instructions are different lines of code.

11. The method of claim 10, wherein the first instruction is located prior to the second instruction in the program.

12. The method of claim 7, further comprising:
    stopping execution at a selected point prior to the error event, wherein the selected point includes the breakpoint in the first instruction, and wherein the error event occurs at a line of code subsequent to the first instruction.

13. The method of claim 3, further comprising:
    stepping to the basic block corresponding with the identifier coupled with the counter; and
    stopping without stepping through an entire run of the program.

14. The method of claim 5, wherein the mismatch notification indicates that a current run does not exactly match a failed run.

15. The method of claim 1, further comprising:
    determining, using the counter coupled with the identifier, a reference to establish a breakpoint.

* * * * *